(12) United States Patent
Tian

(10) Patent No.: US 10,766,291 B1
(45) Date of Patent: Sep. 8, 2020

(54) PAPER CLAMPING MECHANISM AND AUTOMATIC PAGE-TURNING AND UV-SCANNING SYSTEM HAVING SAME FIELD

(71) Applicant: HUBEI RUI TE WEI NETWORK ENGINEERING CO., LTD., Wuhan (CN)

(72) Inventor: Zhongtao Tian, Wuhan (CN)

(73) Assignee: HUBEI RUI TE WEI NETWORK ENGINEERING CO., LTD., Wuhan (CN)

( * ) Notice: Subject to any disclaimer, the term of this patent is extended or adjusted under 35 U.S.C. 154(b) by 0 days.

(21) Appl. No.: 16/600,453

(22) Filed: Oct. 12, 2019

(30) Foreign Application Priority Data

| Apr. 17, 2019 | (CN) | 2019 1 0310498 |
| Jul. 5, 2019 | (CN) | 2019 3 0356149 |
| Jul. 16, 2019 | (CN) | 2019 2 1113473 U |
| Jul. 16, 2019 | (CN) | 2019 2 1114220 U |
| Jul. 16, 2019 | (CN) | 2019 2 1114222 U |
| Jul. 16, 2019 | (CN) | 2019 2 1114224 U |
| Jul. 16, 2019 | (CN) | 2019 2 2223471 U |

(51) Int. Cl.
*B42D 9/06* (2006.01)
*H04N 1/04* (2006.01)

(52) U.S. Cl.
CPC ............... *B42D 9/065* (2013.01); *H04N 1/04* (2013.01); *H04N 2201/0081* (2013.01)

(58) Field of Classification Search
CPC ....... H04N 2201/0434; H04N 1/19594; H04N 1/00567; H04N 1/04; H04N 1/195; H04N 1/00607; H04N 2201/0084; H04N 1/00013; H04N 1/00034; H04N 1/00037; H04N 1/0005; H04N 1/00795; H04N 2201/0081; H04N 1/00559; H04N 1/00564; H04N 1/00588; H04N 1/00602; H04N 2201/0098; H04N 1/00583; H04N 1/0402; H04N 1/0464; H04N 1/1017; H04N 1/1026; H04N 1/1043; H04N 1/1048; H04N 1/1052; H04N 1/1215; H04N 1/125; H04N 1/193;

(Continued)

(56) References Cited

U.S. PATENT DOCUMENTS

| 3,975,975 A * | 8/1976 | Giulie | B26D 3/14 |
| | | | 83/410 |
| 4,091,912 A * | 5/1978 | Moss | B41J 11/30 |
| | | | 226/151 |

(Continued)

*Primary Examiner* — Negussie Worku
(74) *Attorney, Agent, or Firm* — Hemisphere Law, PLLC; Zhigang Ma

(57) ABSTRACT

A paper clamping mechanism includes a base, a first driving, assembly, a first driven assembly, a first clamping portion, and a second clamping, portion. The first driving assembly, is fixed on the base. The first driven assembly is fixed on the base. The first clamping portion is fixed on the base via the first driven assembly. The second clamping portion is fixed on the base via the first driven assembly. The first clamping portion is arranged opposite to the second clamping portion, the first driven assembly is able to drive the first clamping portion to move close to the second clamping portion to clamp a paper, and the first driven assembly is also able to drive the first clamping portion move away from the second clamping portion to release a paper.

18 Claims, 10 Drawing Sheets

(58) Field of Classification Search
CPC ............... H04N 1/32101; H04N 1/626; H04N 2201/0446; H04N 2201/3242; H04N 2201/3247; H04N 5/232; G03G 2215/00282; G03G 5/10; G06K 2209/013; G06K 9/03; G06K 9/4671; G06K 9/6201; G06K 2209/01; G06K 2209/501; G06K 9/00382; G06K 9/00442; G06K 9/00463; G06K 9/20; G06K 9/2063; G06K 9/3283; G06K 9/4604; B65H 2404/13421; B65H 2404/1351; B65H 2404/17; B65H 27/00; G03B 27/52; G03B 27/625; G06F 3/013; G07F 19/20; G07F 19/201
USPC .................................. 358/498, 474, 497, 496
See application file for complete search history.

(56) References Cited

U.S. PATENT DOCUMENTS

| | | | | |
|---|---|---|---|---|
| 4,445,222 A * | 4/1984 | Smitt | ................ | G06F 13/4072 327/108 |
| 5,583,662 A * | 12/1996 | Takahashi | ............ | H04N 1/1017 346/145 |
| 6,044,546 A * | 4/2000 | Yoshie | ..................... | B42B 5/06 270/58.08 |
| 6,135,039 A * | 10/2000 | Tei | ......................... | D05B 29/02 112/237 |
| 8,646,193 B1 * | 2/2014 | Li | ............................ | B42D 9/06 40/533 |
| 2003/0063334 A1 * | 4/2003 | Mandel | .................... | H04N 1/04 358/498 |
| 2003/0063335 A1 * | 4/2003 | Mandel | .................... | H04N 1/04 358/498 |
| 2007/0285742 A1 * | 12/2007 | Wolberg | .................. | B42D 9/04 358/498 |
| 2008/0316551 A1 * | 12/2008 | Taylor | ..................... | H04N 1/04 358/498 |
| 2009/0180085 A1 * | 7/2009 | Rieck | ..................... | G03B 27/52 355/25 |
| 2010/0296138 A1 * | 11/2010 | Jakes | ................. | H04N 1/19594 358/494 |
| 2011/0284118 A1 * | 11/2011 | Kishi | ..................... | B42B 5/126 140/92.3 |
| 2014/0168726 A1 * | 6/2014 | Hasegawa | ................ | B42D 9/06 358/479 |
| 2017/0066274 A1 * | 3/2017 | Hasegawa | ................ | B42D 9/06 |

* cited by examiner

PAPER CLAMPING MECHANISM AND AUTOMATIC PAGE-TURNING AND UV-SCANNING SYSTEM HAVING SAME

FIELD

The subject matter herein generally relates to a paper clamping mechanism and an automatic page-turning and UV(ultraviolet)-scanning system having the same.

BACKGROUND

A scanning device is usually connected to a computer, and configured to capture images and convert a graphic or image into a digital signal using a photoelectric technology and a digital processing technique. For a file document, such as books, files, or a volume of paper and the like, a large number of steps need manpower to participate in the operation of batch photo-taking, scanning or reading-through display, etc., thereby, working strength is very large and efficiency is low.

The existing scanning equipment generally can not automatically hold books. When scanning book data, staff need to place or spread the books evenly in the scanning area, which may lead to the book position is not fixed and reduce the scanning efficiency.

Therefore, there is room for improvement within the art.

BRIEF DESCRIPTION OF THE DRAWINGS

Implementations of the present technology will now be described, by way of example only, with reference to the attached figures.

DETAILED DESCRIPTION

Figure 1:
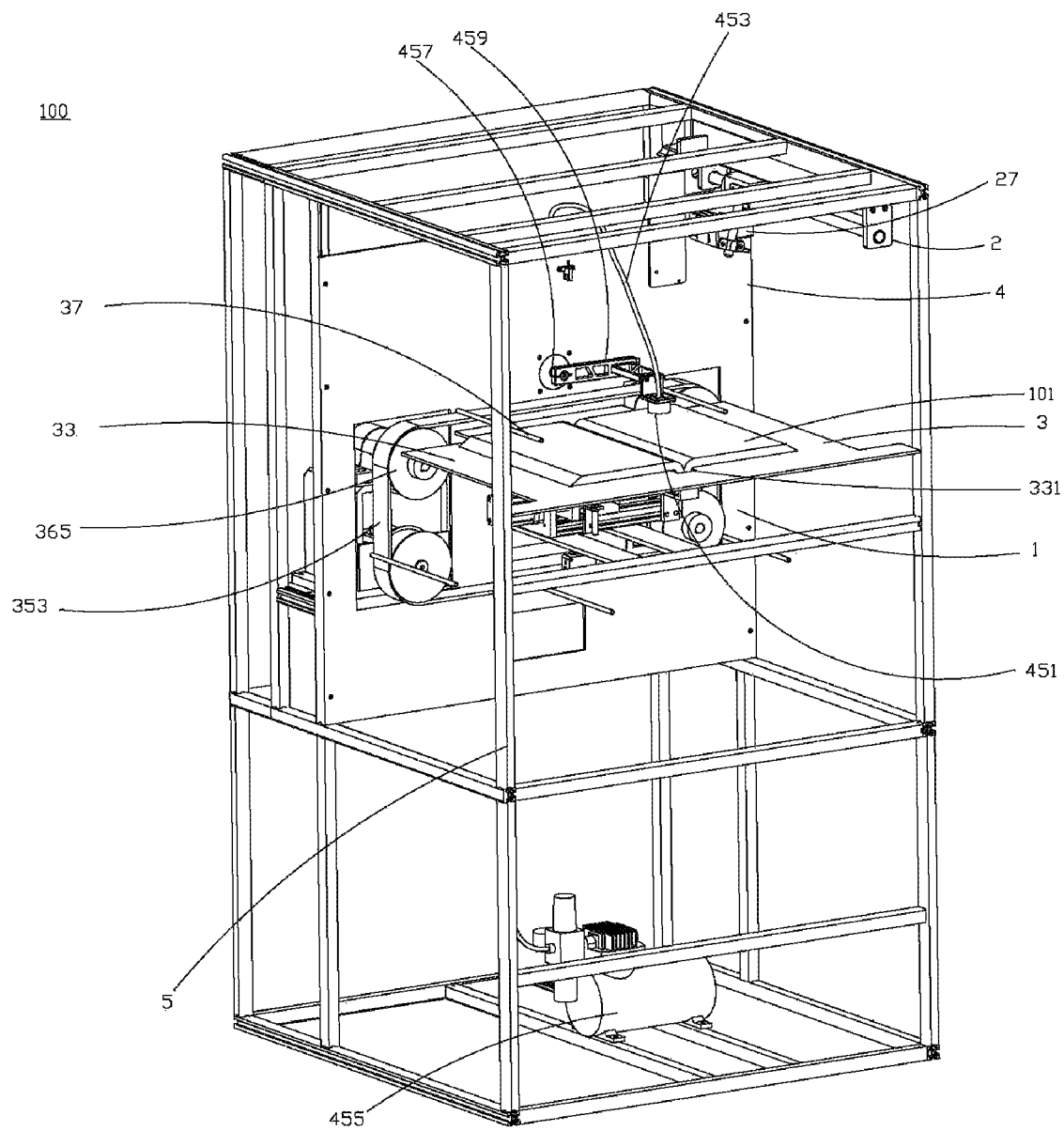
FIG. 1 is an isometric view of an automatic page-turning and scanning system according to one embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to illustrate details and features of the present disclosure better. The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like. The references "a plurality of" and "a number of" mean "at least two."

Figure 2:
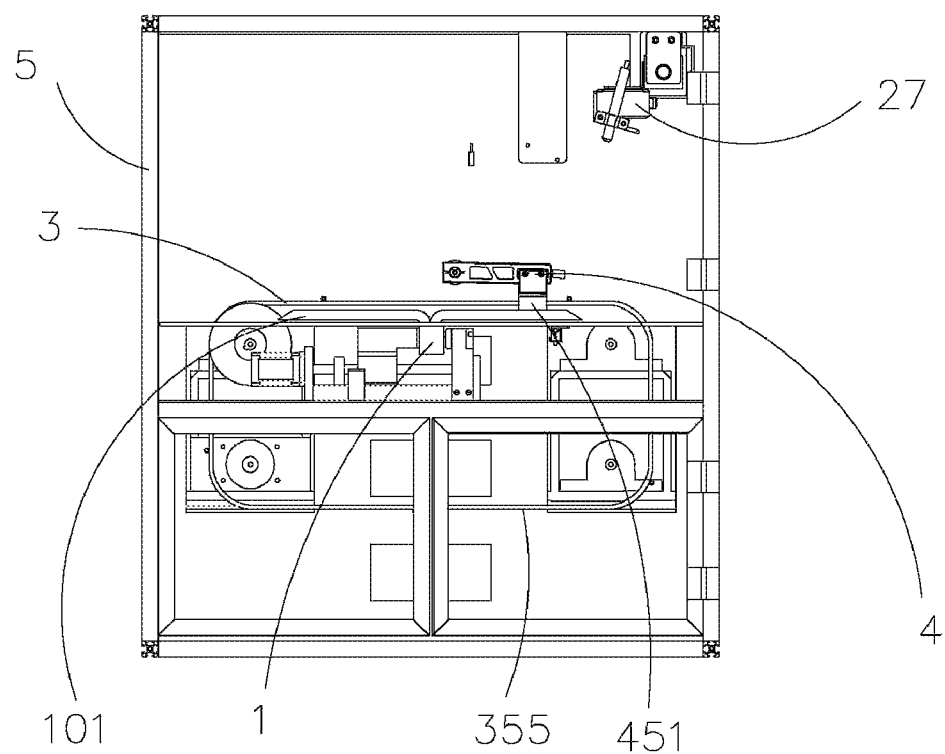
FIG. 2 is a front view of the automatic page-turning and scanning system shown in FIG. 1.

FIGS. 1-2 illustrate an automatic page-turning and scanning system 100 according to one embodiment. The automatic page-turning and scanning system 100 includes a paper clamping mechanism 1, a code-reading apparatus 2, a page-turning mechanism 3, an automatic paper suction apparatus 4 and an outer frame 5.

The outer frame 5 is a skeleton structure formed by multiple edges. The paper clamping mechanism 1, the code-reading apparatus 2, the page-turning mechanism 3, and the automatic paper suction apparatus are fixed on the outer frame 5.

Figure 3:
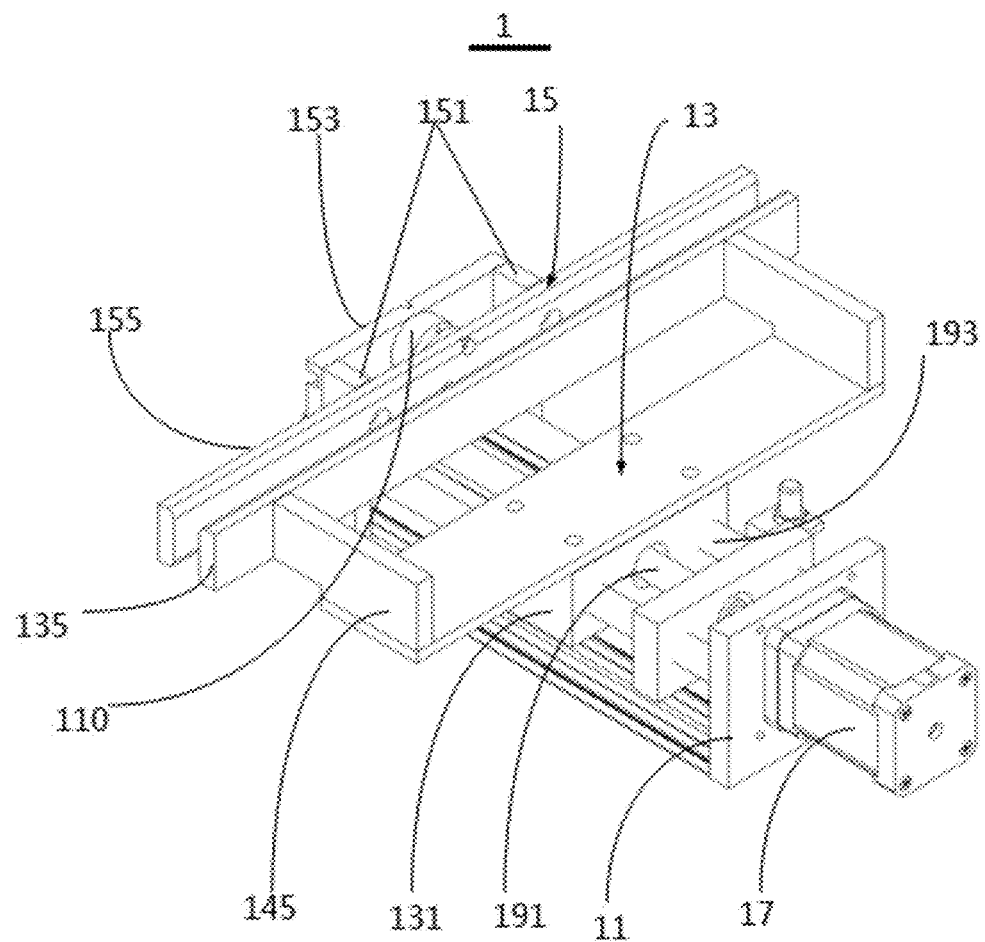
FIG. 3 is an isometric view of a paper clamping mechanism comprised in the automatic page-turning and scanning system in FIG. 1.
Figure 4:
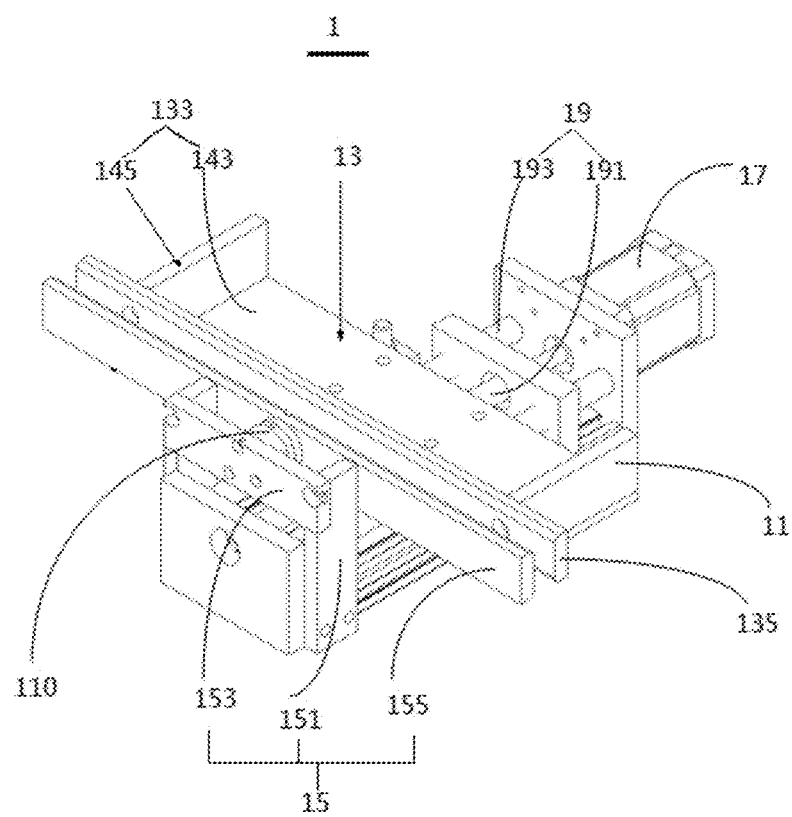
FIG. 4 is another isometric view of a paper clamping mechanism comprised in the automatic page-turning and scanning system in FIG. 1.

As shown in FIG. 3 and FIG. 4, FIG. 3 and FIG. 4 illustrate a paper clamping mechanism 1. The paper clamping mechanism 1 includes a first base 11, a first clamping portion 13, a second clamping portion 15, a first driving assembly 17, and a first driven assembly 19.

The first driving assembly 17 and the first driven assembly 19 are fixed on the first base 11.

The first clamping portion 13 and the second clamping portion 15 are fixed on the base 11 via the first driven assembly 19. The first clamping portion 13 is arranged opposite to the second clamping portion 15. The first driven assembly 19 is able to carry the first clamping portion 13 to move close to the second clamping portion 15 to clamp a paper, and the first driven assembly 19 is also able to drive the first clamping portion 13 move away from the second clamping portion 15 to release a paper. The paper can be one piece paper of a book, one piece paper of a file, or a loose page of an album.

In the embodiment, the first driving assembly 17 is a power source and configured to drive the first driven assembly 19 to move, then the first driven assembly 19 carries the first clamping portion 13 and/or the second clamping portion 15 to move parallel to clamp (release) a paper. The first driving assembly 17 is automatically operated according to commands of a control device (not shown) to drive the first driven assembly 19 to clamp or release a paper, thereby reducing manual operation and improving working efficiency.

In the embodiment, the first driving assembly 17 can be a motor. In the embodiment, the first driving assembly 17 is a servo motor.

When the paper clamping mechanism 1 is working, a binding side of a paper is located between the first clamping portion 13 and the second clamping portion 15, the first clamping portion 13 and the second clamping portion 15 together clamp the binding side, and the automatic page-turning operation is facilitated under a clamping of the paper clamping mechanism 1, and the scanning efficiency is improved.

In the embodiment, alternatively, the first driven assembly 19 at least includes a first screw rod 191. The first screw rod 191 is mounted in the first base 11. An extension direction of the first screw rod 191 is the same as a length direction of the first base 11. The first screw rod 191 is connected with the first driving assembly 17. The first driven assembly 19 is able to drive the first screw rod 191 to move forward or backward, and the first screw rod 191 then carries the first clamping portion 13 and/or the second clamping portion 15 to move.

In the embodiment, the first screw rod 191 is a transmission component of the first base 11, so that the first and second clamping portion arranged in the first base 11 can be driven close or separated, and the paper clamping mechanism 1 is simple and reliable, and is easy to maintain.

In the embodiment, the first clamping portion 13 includes a first sliding block 131, a bracket 133, and a first clamping plate 135. The first sliding block 131 defines at least one through hole.

The first screw rod 191 passes through the at least one through hole of the first sliding block 131 and carries the first sliding block 131 to move. The bracket 133 is substantially a U-shape and includes a bottom plate 143 and two opposite first side plates 145, and a bottom surface of the bottom plate 143 is fixed on the first sliding block 131 and can be move along with the first sliding block 131. The first clamping plate 135 is fixed to side of the two first side plates 145, and the first clamping plate 135 can be move along with the bracket 133.

In the embodiment, the first sliding block 131 and the first screw rod 191 together form a lead screw transmission system, an operation of the paper clamping mechanism 1 is stable. The bracket 133 is used for connecting the first clamping plate 135 and the first sliding block 131, and an overall stability is high, and the maintenance is convenient.

In the embodiment, the second clamping portion 15 includes two second side plates 151, a connecting plate 153, and a second clamping plate 155.

The second clamping plate 155 is arranged parallel to the first clamping plate 135 and away from the first base 11. The two side plates 151 are arranged parallel to each other and respectively perpendicularly to the second clamping plate 155. Ends of the side plates 151 away from the second clamping plate 155 is fixed on the connecting plate 153.

The first clamping plate 135 and the second clamping plate 155 cooperate to clamp a paper. Preferably, the second clamping plate 155, the side plates 151 and the connecting plate 153 are integrally fixed on the first base 11.

The first clamping plate 135 is move parallel so that the first clamping portion 13 and the second clamping portion 15 are able to move in close proximity to each other.

In this embodiment, the two side plates 15 are fixed on both sides of the first base 11, and the top of the side plate 151 is fixed to the connecting plate 153 to form a support for supporting the second clamping plate 155. In the embodiment, a position of the second clamping plate 155 is fixed, the first clamping plate 135 moves toward the second clamping plate 155 to hold a paper.

In the embodiment, the paper clamping mechanism 1 further includes a pressure sensor 110. The pressure sensor 110 is fixed on the first clamping portion 13 and/or the second clamping portion 15.

In the embodiment, the first clamping portion 13 and/or the second clamping portion 15 are in direct contact with a paper, and a clamping action can be controlled by detecting the pressure exerted by the first and second clamping portion, and a working state of the paper clamping mechanism 1 is realized through the pressure sensor 110, and to check the paper whether is properly clamped. In addition, the pressure sensor 110 can apply a rated pressure to an easily damaged paper, reduce a damage to a paper.

In the embodiment, one end of the pressure sensor 110 is fixed to the connecting plate 153, and the other end of the pressure sensor 110 contacts the second clamping plate 155, for detecting the pressure between the first clamping plate 135 and the second clamping plate 155.

In this embodiment, the pressure sensor 110 is used to detect clamping pressure applied by the paper clamping mechanism 1 to a paper, and a working state of the paper clamping mechanism 1 is obtained by the pressure sensor 110 to detect whether the paper is properly fixed (clamped). Optionally, portion of the first clamping portion 13 and portion of the second clamping portion 15 in contact with a paper are designed in a plate shape.

In this embodiment, the first driven assembly 19 further includes an auxiliary screw rod 193. The auxiliary screw rod 193 is arranged in parallel with the first screw rod 191, the auxiliary screw rod 193 is connected to the first driving assembly 17, the first driving assembly 17 is able to drive the auxiliary screw rod 193, the auxiliary screw rod 193 matches with the first screw rod 191 together drive the first clamping portion 13 and/or the second clamping portion 15 to move.

In the embodiment, the auxiliary screw rod 193 is two, and the two auxiliary screw rod 193 are respectively arranged on two sides of the first screw rod 191, the auxiliary screw rod 193 and the first screw rod 191 cooperate to improve the overall stability and the accuracy of the first driven assembly.

Figure 5:
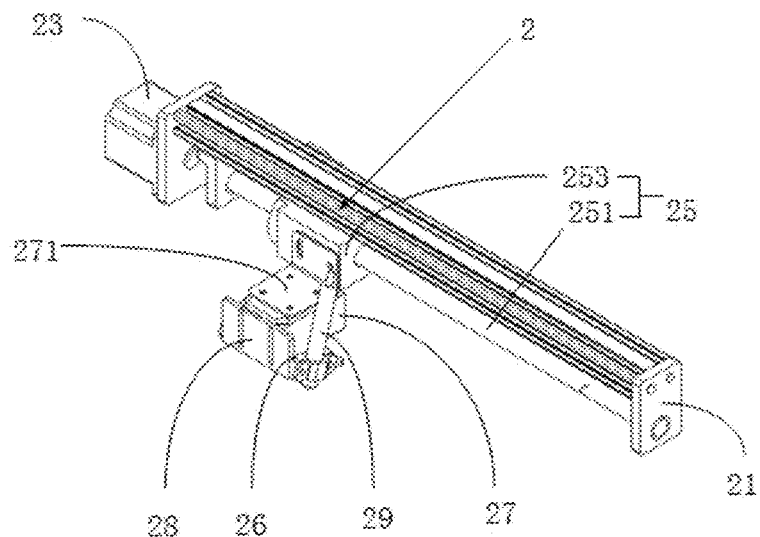
FIG. 5 is an isometric view of a code-reading apparatus comprised in the automatic page-turning and scanning system in FIG. 1.

The code-reading apparatus 2 is configured to scan invisible two-dimension codes formed on each page of the file document. As shown in FIG. 5, the code-reading apparatus 2 includes a second base 21, a second driving assembly 23, a second driven assembly 25, a scanning assembly 27 and a light source 29.

The second driving assembly 23 is a power source and fixed to the second base 21. The second driven assembly 25 is fixed to the second base 21 and connected with the second driving assembly 23 for adjusting a position of the scanning assembly 27. The scanning assembly 27 is connected with the second driven assembly 25 for acquiring image information of a paper to be scanned, and then reading a code of the paper. The light source 29 and the scanning assembly 27 are arranged in parallel. The light source 29 is connected to the second driven assembly 25 and/or the scanning assembly 27, and the light source 29 is configured to illuminate a paper to be scanned.

The second driving assembly 23 is configured for driving the second driven assembly 25 to move, and the second driven assembly 25 carries the scanning assembly 27 to move in parallel, and the scanning assembly 27 points to a paper to be scanned and acquire image information of the paper.

In this embodiment, the second base 21 carries the second driving assembly 23 and the second driven assembly 25, the scanning assembly 27 is mounted on the second driven assembly 25, the light source 29 is attached to the scanning assembly 27, the second driven assembly 25 carries the scanning assembly 27 to move over the paper to be scanned under the drive of the second driving assembly 23. The light source 29 irradiates the paper to be scanned, the anti-interference capability of the scanning assembly 27 can be improved, the reliability of the image is increased, and the two-dimension code recognition efficiency is improved.

In addition, the code-reading apparatus 2 further includes an optical filter 26. The optical filter 26 is arranged at an outside of an image capturing structure of the scanning assembly 27. The optical filter 26 is used for filtering the ambient interference light rays, and improving the scanning efficiency and the scanning accuracy.

In the embodiment, the code-reading apparatus 2 further includes a filter holder 28, the filter holder 28 is fixed to the scanning assembly 27, and the optical filter 26 is fixed to the outside of the image capturing structure of the scanning assembly 27 by the filter holder 28. The filter holder 28 can not only fix the optical filter 26 but also facilitate the maintenance and replacement of the optical filter 26.

In the embodiment, the second driven assembly 25 is optionally a slide rail mechanism, and the slide rail mechanism is adopted to drive the scanning assembly 27 to be positioned, the stability is high, the picture is not easy to shake, the scanning picture is clear and reliable, and the translation process is easy to control.

In the embodiment, alternatively, the second driven assembly 25 specifically includes a second screw rod 251 and a second sliding block 253. The second screw rod 251 is mounted on the second base 21, the second screw rod 251 is connected with the second driving assembly 23, the second sliding block 253 is sleeved and matched with the second screw rod 251, and the second screw rod 251 can drive the second sliding block 253 to move.

In the embodiment, the second driven assembly 25 is a lead screw transmission mechanism, the second screw rod 251 is matched with the second sliding block 253 to drive the second sliding block 253 to move parallel, the structure is simple and stable.

In the embodiment, the image capturing structure of the scanning assembly 27 is a camera, and the camera is connected with the second driven assembly 25 through a bent plate 271, and lenses of the camera are pointed to a paper to be scanned.

In the embodiment, a camera is a main part of the scanning assembly 27, and the camera is arranged on the executive part (the second sliding block 253) of the second driven assembly 25 through a connecting member (the bent plate 271), and the scanning assembly 13 is easy to maintain.

In the embodiment, the scanning assembly 27 is a two-dimension code reader, and the two-dimensional code reader is fixedly connected with the second driven assembly 25, and used for reading two-dimensional code image formed on a paper.

In the embodiment, a two-dimension code reader is adopted as a main part of the scanning assembly 27, reading efficiency of the two-dimension code can be improved, and the process of scanning and reading the two-dimension code is more stable and high-efficiency.

In the embodiment, the light source 29 is optionally an violet light, and the ultraviolet lamp is attached to an outside of the scanning assembly 27 by a connecting member for irradiating the data, so as the scanning assembly 27 can obtain reflected light.

In the embodiment, the light source 29 is fixed on one side of the scanning assembly 27, the light source 29 and the scanning assembly 27 are in common alignment with the data to be scanned.

In the embodiment, the second driving assembly 23 is optionally an electric motor, and the second driving assembly 23 is connected to the second driven assembly 25 to drive the second driven assembly 25.

In the embodiment, the motor can be a servo motor, the servo motor is fixed at one end of the second base 21, the servo motor is connected with the second driven assembly 25, the servo motor is operated according to the command of the control device, the second driven assembly 25 is driven to align the scanning assembly 27 with the two-dimensional code, and the reading efficiency is improved, a manual operation is reduced, and thereby, the working efficiency is improved.

Figure 6:
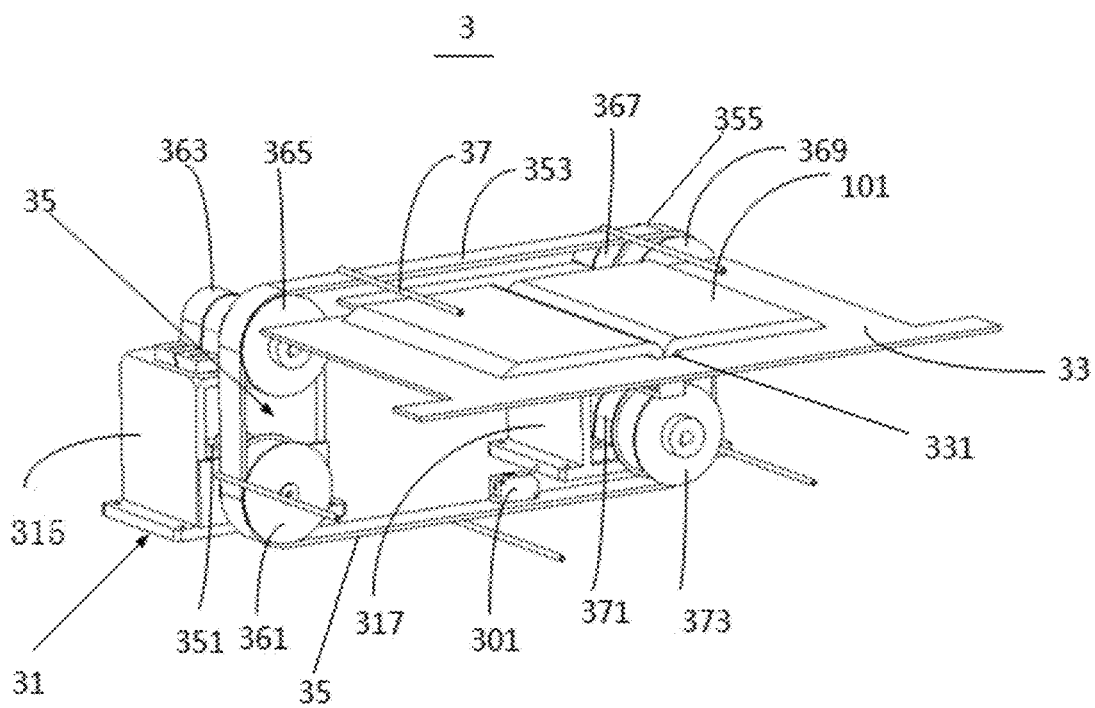
FIG. 6 is an isometric view of a page-turning mechanism comprised in the automatic page-turning and scanning system in FIG. 1.

As shown in FIG. 6, the page-turning mechanism 3 includes a pedestal 31, a tray 33, a driving portion 35, and a plurality of lifting levers 37.

One side of the tray 33 is perpendicularly fixed on the pedestal 31, the other side of the tray 33 is extended outwards and used for carrying the file document 101 to be scanned.

The tray 33 is used to carry the file document 101 to be scanned. In the embodiment, a middle of the tray 33 is defined with a limiting window 331, and the limiting window 331 is arranged corresponding to the clamping groove formed by the first clamping portion 13 and the second clamping portion 15. A binding side of the file document 101 extends into the limiting window 331.

The driving portion 35 is mounted in the pedestal 31. The driving portion 35 includes a moving portion (not shown). One end of each lifting lever 37 is fixed on the moving portion, and the other end of each lifting lever 37 is sweeping the file document 101 and contact the file document 101, for turning page of the file document 101.

In addition, the page-turning mechanism 3 further includes a reset sensor 301. The reset sensor 301 is mounted on the pedestal 31 and configured for detecting movement of the driving portion 35. The reset sensor 301 is favorable for monitoring the operation condition of the driving portion 35, and improving the running stability of the driving portion 35, so that the page-turning action is stable and reliable.

In the embodiment, the driving portion 35 optionally includes a driving motor 351, a synchronous belt 353 and a plurality of synchronous wheels. The synchronous belt 353 is sleeved and matched with the plurality of synchronous wheels, and the synchronous wheels drive the synchronous belt 353. The driving motor 351 is connected with a plurality of synchronous wheels through a bearing mechanism to drive a synchronous wheel. The lifting lever 37 is fixed over one surface of the synchronous belt 353, the driving motor 351 drives the synchronous wheels to rotate, and the synchronous wheels drive the synchronous belt 353 to rotate. An extending direction of the lifting lever 37 is perpendicular to a movement direction of the synchronous belt 353, and the lifting lever 37 can be swept over the tray 33 with the synchronous belt 353 to turn the file document 101.

In the embodiment, the synchronous wheels and the synchronous belt 353 together form the driving portion 35, and the driving portion 35 drives the lifting lever 37 to execute the page-turning action, and the synchronous belt 353 is adopted, so that the page-turning action is stable and reliable, and the controllability is high.

In the embodiment, the driving portion 35 includes four synchronization wheels, and the shape of the transfer track consisted by the synchronous wheels and the synchronous belt 353 is a rounded rectangle, and the tray 33 is in the interior of the rounded rectangle shape transfer track.

In the embodiment, four synchronous wheels and the synchronous belt 353 form a rectangular track 355, the tray 33 is located at an inner side of the rectangular track 355, the file document 101 is placed on the tray 33 and close to the upper side of the rectangular track 355, and the lifting lever 37 on the rectangular track can turn the paper of the file document 101 and improve the page-turning efficiency.

In the embodiment, the pedestal 31 includes a first pedestal 315 and a second pedestal 317. A lower end of the first pedestal 315 is provided with the driving motor 351. The driving motor 351 is connected to the first synchronizing wheels 361, and the first synchronizing wheel 361 serves as a driving wheel for providing power, the upper end of the first pedestal 315 is provided with a second bearing mechanism 363. The second bearing mechanism 363 is connected with the second synchronous wheel 365. The second pedestal 317 is arranged in parallel with the first pedestal 315. An upper end of the second pedestal 317 is provided with a third bearing mechanism 367; the third bearing mechanism 367 is connected with the third synchronous wheel 369. The lower end of the second pedestal 317 is provided with a fourth bearing mechanism 371, and the fourth bearing mechanism 371 is connected to the fourth synchronizing wheel 373. The driving motor 351 is capable of driving the first synchronizing wheel 361 to rotate, and the second synchronizing wheel 365, the third synchronizing wheel 369, and the fourth synchronizing wheel 373 are driven to move in the cooperation of the synchronous belt 353.

In the embodiment, alternatively, the page-turning mechanism 3 includes five lifting levers 37, and the lifting levers 37 are distributed in the length direction of the synchronous belt 353, and the length direction of the lifting lever 37 is perpendicular to the length direction of the synchronous belt 353.

In the embodiment, the lifting levers 37 are uniformly distributed over a surface of the synchronous belt 353, and the five lifting levers 37 pass through the file document 101 in sequence during the translation of the synchronous belt 353, and the paper which is brought by the adsorption device in the file document 101 completes the page-turning under the turning of the lifting lever 37, and the page-turning efficiency is improved.

In the embodiment, the lifting lever 37 is made of carbon fiber. Carbon fiber is light in mass and high in strength, and when the lifting lever 37 is in contact with the file document 101 during the movement, the abrasion of the paper of the lifting lever 37 on the file document 101 can be reduced, and the reliability of the lifting lever 37 is improved.

In the embodiment, the driving motor 351 is a servo motor for providing a power source for the driving portion 35.

Figure 7:
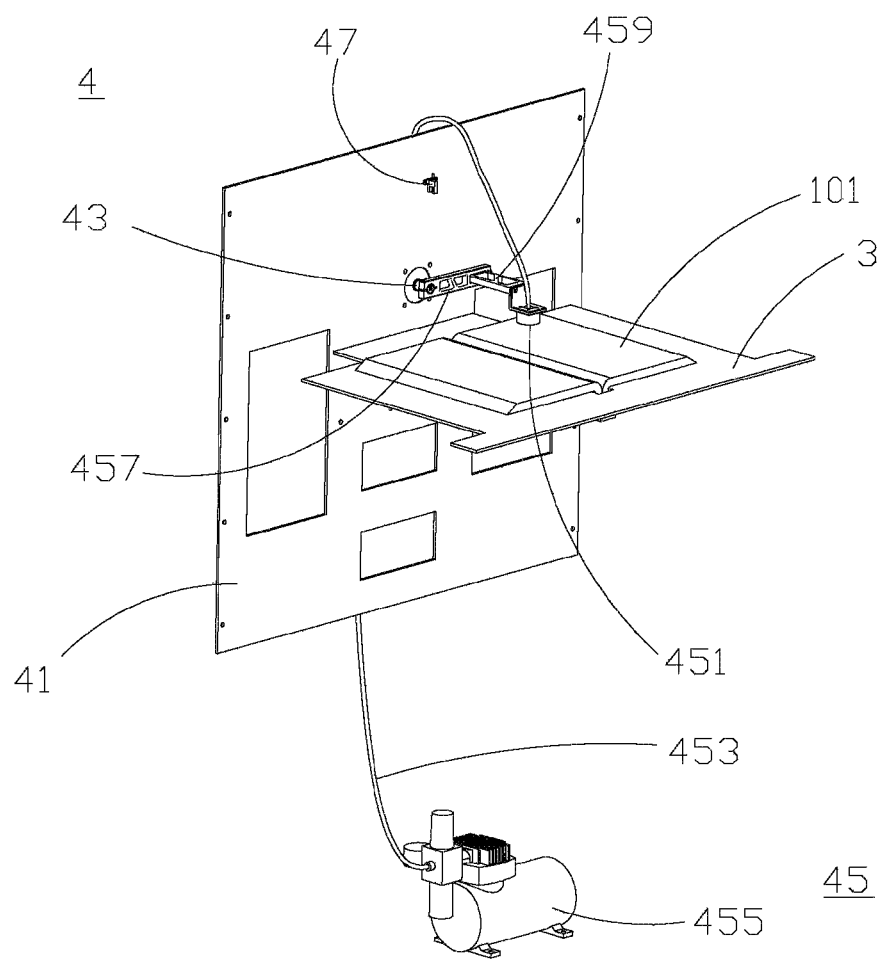
FIG. 7 is an isometric view of an automatic paper suction apparatus comprised in the automatic page-turning and scanning system in FIG. 1.

As shown in FIG. 7, the automatic paper suction apparatus 4 includes a side fixing plate 41, a third driving assembly 43, an adsorption portion 45 and a limiting sensor 47.

The side fixing plate 41 is perpendicularly connected with the tray 33. In the embodiment, the side fixing plate 41 defines a mounting hole. The tray 33 is mounted at a lower side of the mounting hole.

The third driving assembly 43 includes a moving portion. The moving portion is connected to the adsorption portion 45, and the adsorption portion 45 can change the air flow state above the file document 101 to adsorb one piece paper of the file document 101, and the adsorption portion 45 can be driven by the third driving assembly 43 to performance a curve motion above the file document 101. The moving portion of the third driving assembly 43 is extended from the mounting hole, and the limiting sensor 47 is fixed to the side fixing plate 41.

In the embodiment, when the adsorption portion 45 is close to one piece paper of the file document 101, the air pressure on both sides of the paper can be changed, and the adsorption portion 45 performance a curvilinear motion under a drive of the third driving assembly 43, can be close to or away from the away from the file document 101. When the adsorption portion 45 is close to the paper, adsorption is started. After the paper is sucked away from the file document 101, the single-page paper can be driven to complete the page turning, and the page turning can be carried out according to the technical method to effectively reduce the heavy-page phenomenon. In addition, the page turning is performed by changing the air pressure difference of the air flow, the efficiency of the scanning work can be improved, and the loss of the page turning action on the file document 101 can be reduced.

The limiting sensor 47 is arranged at the movement plane of the adsorption portion 45 and configured for detecting and limiting motion trajectory of the adsorption portion 45.

In the embodiment, the limiting sensor 47 can limit the rotation trajectory of the adsorption portion 45, move the adsorption portion 45 within a predetermined range, and improve the page turning efficiency.

In the embodiment, the third driving assembly 43 is fixed on one side of the side fixing plate 41, and a moving portion of the third driving assembly 43 is extended to the other side of the side fixing plate 41, and the limiting sensor 47 and the moving portion are on the same side.

In the embodiment, the adsorption portion 45 includes a connecting rod, non-contact sucking disc 451, a gas pipe 453 and an air pump 455. One end of the connecting rod is connected with a moving portion of the third driving assembly 43, the other end of the connecting rod is fixed with the non-contact sucking disc 451, and the non-contact sucking disc 451 can be close to or away from the file document 101. The non-contact sucking disc 451 is capable of changing the air flow above the file document 101 to adsorb the file document 101, the connecting rod with the non-contact sucking disc 451 is able to move curve up above the file document 101 to turn page of the file document 101.

The air pump 455 is connected to the non-contact sucking disc 451 through the gas pipe 453, and the air pump 455 and the non-contact sucking disc 451 cooperate to change air flow above the file document 101 so as to absorb paper of the file document 101.

In the embodiment, the air pump 455 is used as a power source of the adsorption portion 45 to change air flow distribution over the file document 101, and change the air pressure difference on upper and lower sides of the file document 101, and the page turning stability is improved.

In the embodiment, the connecting rod includes a first connecting rod 457 and a second connecting rod 459. One end of the first connecting rod 457 is sleeved with the moving portion of the third driving assembly 43, a length direction of the first connecting rod 457 is perpendicular to an axial direction of the moving portion of the third driving assembly 43. One end of the second connecting rod 459 is fixedly connected to a free end of the first connecting rod 457, and the other end of the second connecting rod 459 is fixedly connected to the non-contact sucking disc 451. The first connecting rod 457 and the second connecting rod 459 are arranged perpendicular to each other.

In the embodiment, alternatively, the third driving assembly 43 can be a servo motor. The servo motor is a moving portion (executing mechanism) of the third driving assembly 43, the servo motor access a control device and operated according to a control instruction of the control device, and the working efficiency is improved.

When the automatic page-turning and scanning system 100 is working, a file document 101 to be scanned is placed on the tray 33, and a binding side of the file document 101 is located in the limiting window 331, and the paper clamping mechanism 1 clamps the binding side, the lifting levers 37 are moved, the automatic paper suction apparatus 4 moves above the paper and adsorbs one piece of paper by the pressure difference generated by a change of the air flow, and after the paper is sucked up, the lifting lever 37 of the page-turning mechanism 3 extends into the lower side of the file document 101 adsorbed by the automatic paper suction apparatus 4 to implement a page-turning action, the scanning assembly 27 is arranged on the outer frame 1, and facing the file document 101, the scanning assembly 27 is used for acquiring an image information of the file document 101.

Figure 8:
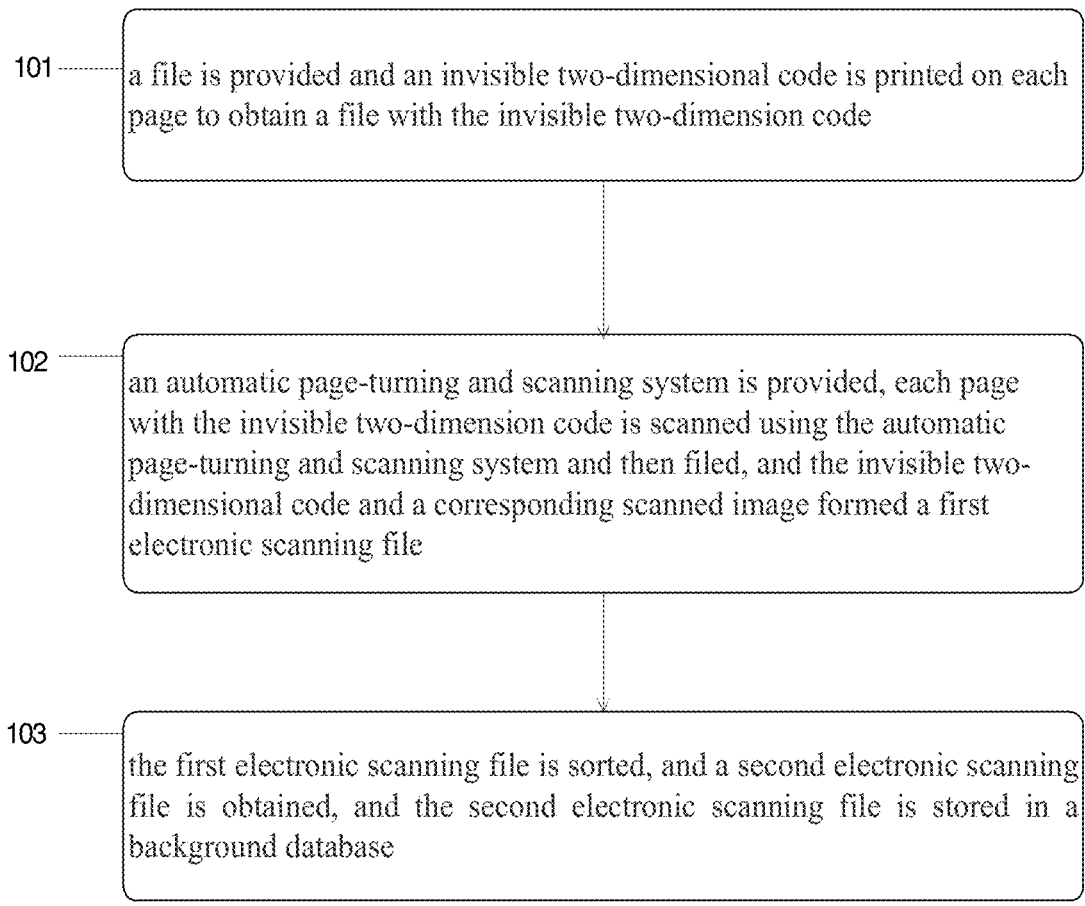
FIG. 8 is a flowchart of a file document management method based on invisible two-dimension code as identification using the automatic page-turning and scanning system in FIG. 1.

FIG. 8 illustrates a method for file document management using the automatic page-turning and scanning system 100 according to one embodiment. The method is provided by way of example as there are a variety of ways to carry out the method. The method 1 can begin at block 101.

Referring to FIG. 8, a flowchart of a file document management method based on an invisible two-dimensional code as an identification in an embodiment of the present invention includes the steps of:

At block 101: a file document is provided, the file document includes a plurality of pages, an invisible two-dimensional code is printed on each page, and the file with the invisible two-dimension code is obtained.

At block 102, an automatic page-turning and scanning system 100 is provided, and the automatic page-turning and scanning system 100 includes a paper clamping mechanism 1, a code-reading apparatus 2, a page-turning mechanism 3, an automatic paper suction apparatus 4 and an outer frame 5. The paper clamping mechanism 1 clamps the file document. Specifically, a binding side of a paper is located between the first clamping portion 13 and the second clamping portion 15, the first clamping portion 13 and the second clamping portion 15 together clamp the binding side.

The code-reading apparatus 2 is configured to scan invisible two-dimension codes formed on each page of the file document.

The page-turning mechanism 3 is configured to turn page of the file document.

The automatic paper suction apparatus 4 is configured to adsorb one page of the file document when turning page.

Each page with the invisible two-dimension code is scanned using the automatic page-turning and scanning system 100 and then filed, each page is printed with an invisible two-dimension code, therefore, a scanned image of each page is corresponded to each invisible two-dimensional code, and the invisible two-dimensional code and a corresponding scanned image formed a first electronic scanning file.

At block 103, the first electronic scanning file is sorted, and a second electronic scanning file is obtained, and the second electronic scanning file is stored in a background database.

Figure 9:
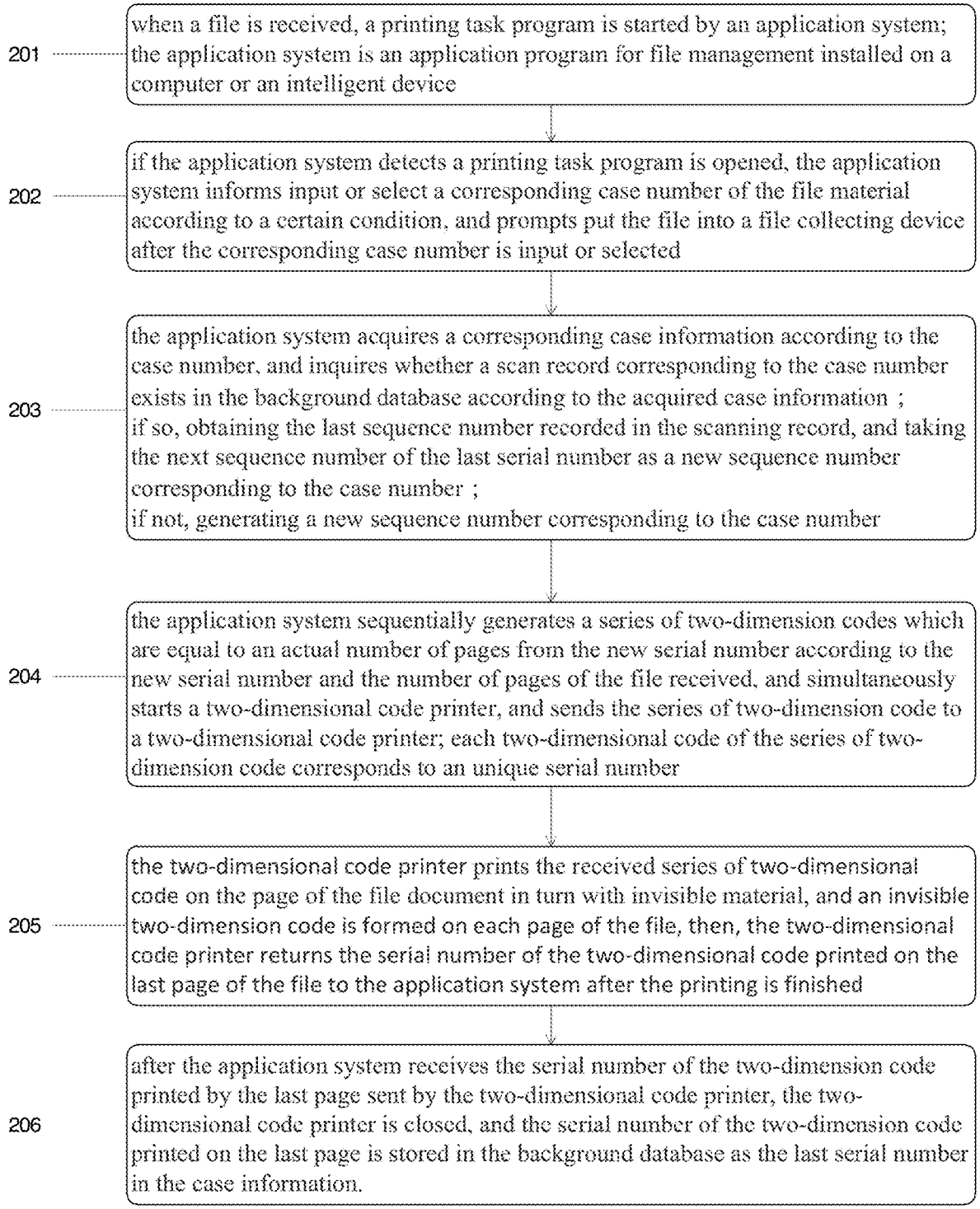
FIG. 9 is a flowchart of printing invisible two-dimension code on each page of a file document to be received according to one embodiment.

Referring to FIG. 9, the block 101 includes the following detailed steps:

At block 201: when a file is received, a printing task program is started by an application system; the application system is an application program for file management installed on a computer or an intelligent device.

At block 202: if the application system detects that a printing task program is opened, the application system informs input or select a corresponding case number of the file document according to a certain condition, and prompts put the file into a file collecting device after the corresponding case number is input or selected.

At block 203: the application system acquires a corresponding case information according to the case number, and inquires whether a scan record corresponding to the case number exists in the background database according to the acquired case information. if so, obtaining the last sequence number recorded in the scanning record, and taking the next sequence number of the last serial number as a new sequence number corresponding to the case number, and then, and proceeding to step block 204; if not, generating a new sequence number corresponding to the case number, and proceeding to block 204;

At block 204: the application system sequentially generates a series of two-dimension codes which are equal to an actual number of pages from the new serial number according to the new serial number and the number of pages of the file received, and simultaneously starts a two-dimensional code printer, and sends the series of two-dimension code to a two-dimensional code printer; each two-dimensional code of the series of two-dimension code corresponds to an unique serial number.

At block 205: the two-dimensional code printer prints the received series of two-dimension code on the page of the file document in turn with invisible material. The invisible material includes a fluorescent ink, a fluorescent carbon powder, a fluorescent color band, and infrared ink and so on. An invisible two-dimension code is formed on each page of the file, then, the two-dimensional code printer returns the serial number of the two-dimensional code printed on the last page of the file to the application system after the printing is finished. The invisible two-dimensional code is not visible to the naked eye in a normal state, and only a special reading device can recognize and interpret the information encrypted in the two-dimensional code in the state, and the invisible two-dimensional code can be used for preventing the appearance of the file to be printed when the mark is prevented.

At block 206: When the application system receives the serial number of the two-dimension code printed by the last page sent by the two-dimensional code printer, the two-dimensional code printer is closed, and the serial number of the two-dimension code printed on the last page is stored in the background database as the last serial number in the case information.

Figure 10:
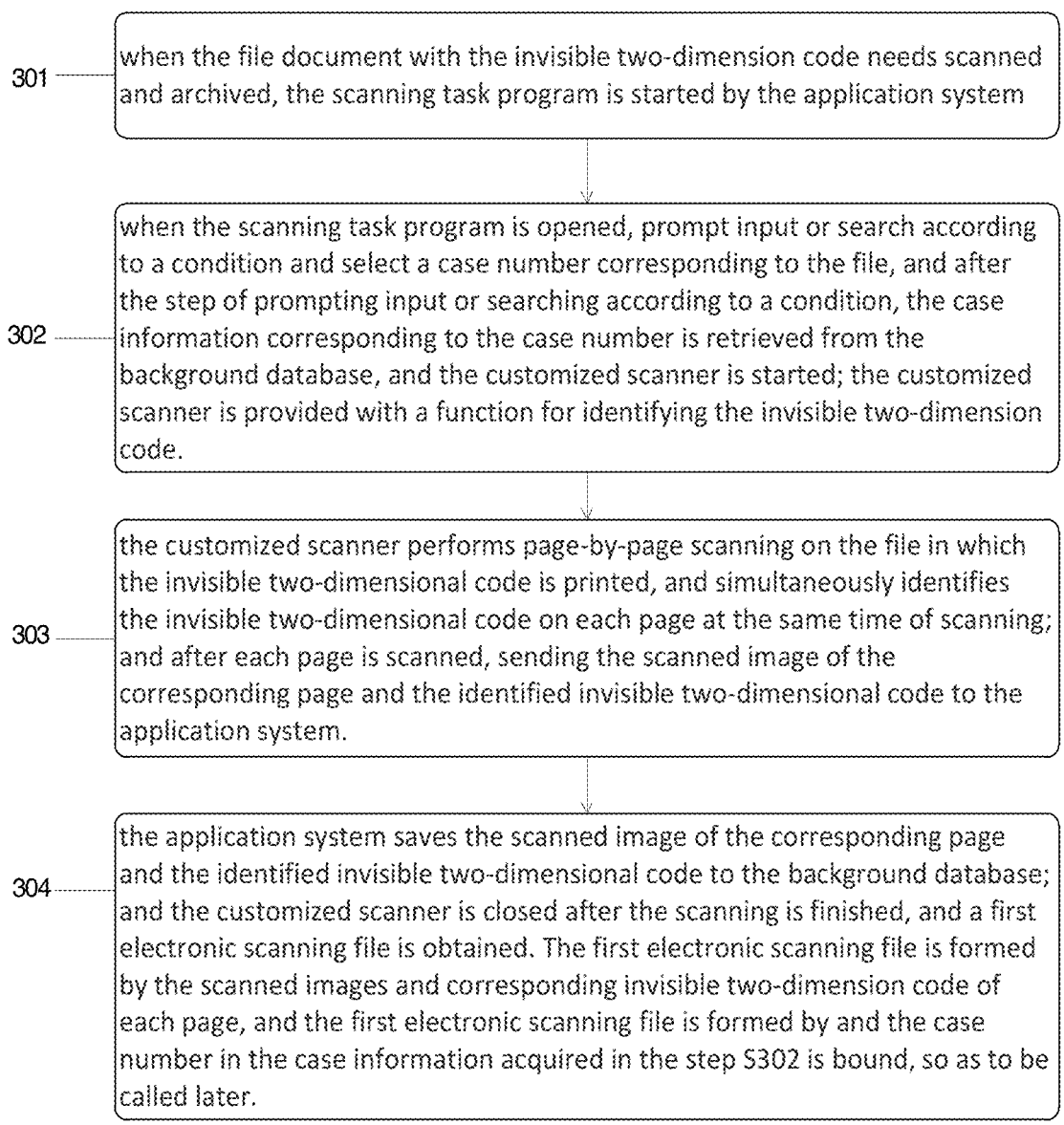
FIG. 10 is a flowchart of scanning and archiving the file document printed with the invisible two-dimension code in FIG. 9.

Referring to FIG. 10, FIG. 10 is a specific flowchart of block 102, includes the following detailed steps:

At block 301: when the file document with the invisible two-dimension code is scanned and archived, the scanning task program is started by the application system;

At block 302: when the scanning task program is opened, prompt input or search according to a condition and select a case number corresponding to the file, and after the step of prompting input or searching according to a condition, the case information corresponding to the case number is retrieved from the background database, and the customized scanner is started; the customized scanner is provided with a function for identifying the invisible two-dimension code.

At block 303: the customized scanner performs page-by-page scanning on the file in which the invisible two-dimensional code is printed, and simultaneously identifies the invisible two-dimensional code on each page at the same time of scanning; and after each page is scanned, sending the scanned image of the corresponding page and the identified invisible two-dimensional code to the application system.

At block 304, the application system saves the scanned image of the corresponding page and the identified invisible two-dimensional code to the background database; and the customized scanner is closed after the scanning is finished, and a first electronic scanning file is obtained. The first electronic scanning file is formed by the scanned images and corresponding invisible two-dimension code of each page, and the first electronic scanning file is formed by and the case number in the case information acquired in the step S302 is bound, so as to be called later.

Figure 11:
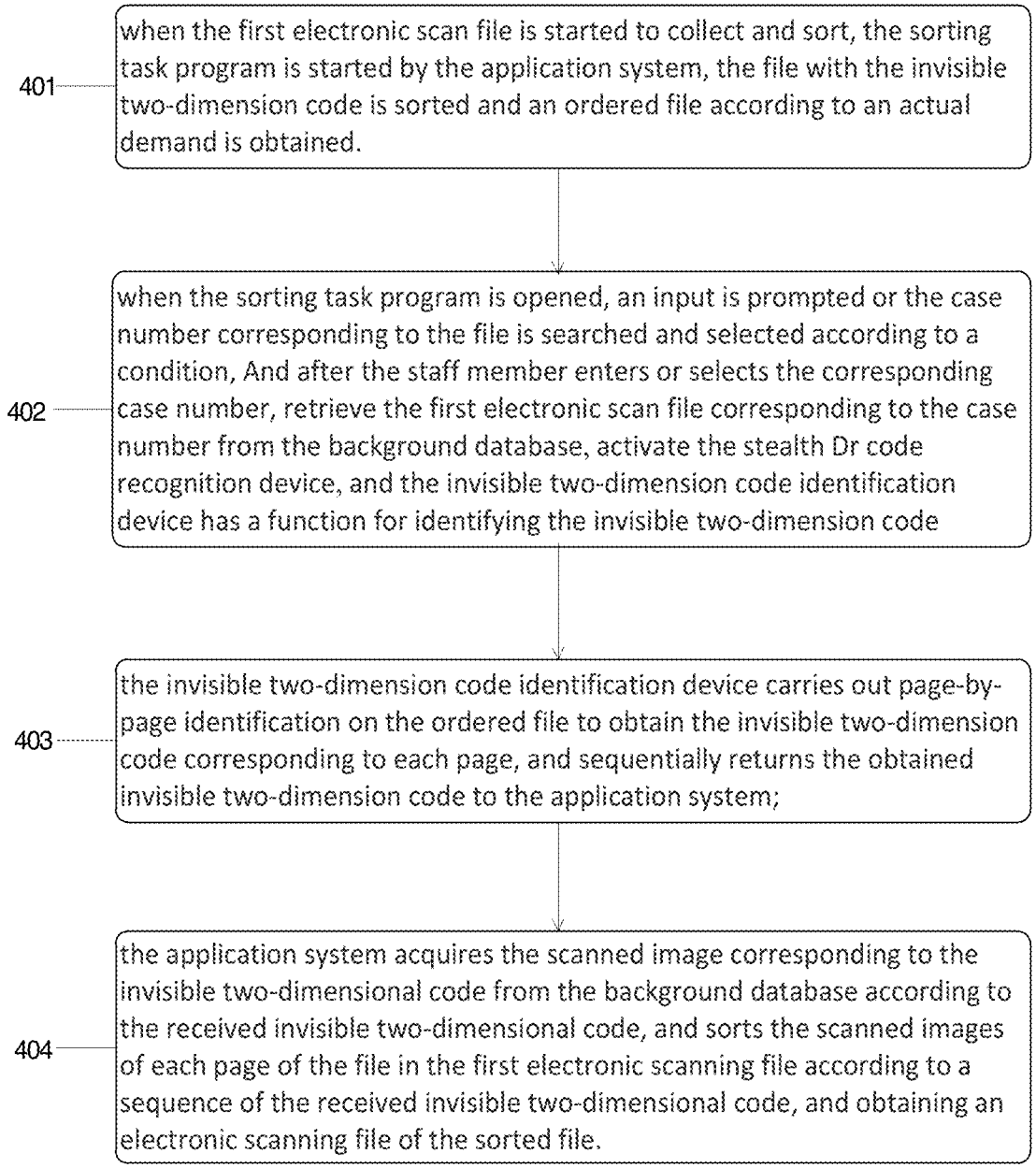
FIG. 11 is a flowchart of sorting a first electronic scanning file document according to one embodiment.

Referring to FIG. 11, FIG. 11 is a specific flow of block 103, block 103 includes the following detailed steps:

At block 401: When the first electronic scan file is started to collect and sort, the sorting task program is started by the application system, the file with the invisible two-dimension code is sorted and an ordered file according to an actual demand is obtained.

At block 402: When the sorting task program is opened, an input is prompted or the case number corresponding to the file is searched and selected according to a condition, And after the staff member enters or selects the corresponding case number, retrieve the first electronic scan file corresponding to the case number from the background database, activate the stealth Dr code recognition device, and the invisible two-dimension code identification device has a function for identifying the invisible two-dimension code.

At block 403: the invisible two-dimension code identification device carries out page-by-page identification on the ordered file to obtain the invisible two-dimension code corresponding to each page, and sequentially returns the obtained invisible two-dimension code to the application system;

At block 404: the application system acquires the scanned image corresponding to the invisible two-dimensional code from the background database according to the received invisible two-dimensional code, and sorts the scanned images of each page of the file in the first electronic scanning file according to a sequence of the received invisible two-dimensional code, and obtaining an electronic scanning file of the sorted file.

Wherein in block 202, the file is one page or a plurality of pages of paper material.

Wherein in block 203, the case information includes case number, case type, date, serial number, and scanning record, and the like, and the scan recorded refers to the last serial number of the last scanning.

Wherein in block 205, When the two-dimensional code printer finished printing, the application system notifies the two-dimensional code printer to print a summary return list, and staff can examine the summary return list. The summary return list includes name of the case to be disposed and a sequence number of the two-dimensional code of last page of the file, but does not include the specific information contained in the invisible two-dimensional code.

Wherein in block 304, when the scanning is finished, the application system notifies the printer to print a detailed return list for staff to view. The detailed return list includes specific information of the invisible two-dimension code formed on all the pages of the file.

Particularly, the method for file document management is carried out as a specific embodiment.

A file A comprising a plurality of pages need to be received. Firstly, a two-dimension code need to be printed on each pages of the file A, and the two-dimension code sequence number printed on the last page is stored in the background database for next viewed.

then, the pages of the file A with the invisible two-dimension code are scanned and filed to obtain an unordered electronic document of the file A, and each page of the electronic document corresponds to an invisible two-dimensional code, and the corresponding pages can be managed and sorted according to the invisible two-dimensional code.

Finally, staff sorts the file A manually, and sequentially identifies the invisible two-dimensional code on each page of the sorted file A, and sorts the pages of the electronic document according to the recognition order, and finally obtains an electronic document with the actual ordering. The entire file business process is over.

By using the invisible two-dimension code to track and manage the file, the material and material resources can be greatly saved, and the hidden two-dimension code has multiple anti-counterfeiting characteristics, and can be made by adopting a password anti-counterfeiting, software encryption and the like so as to be more confidential and anti-counterfeiting and unique.

As a part of an Internet of Things technology, the two-dimension code is more and more popular with the consumers. The client or the consumer scans the two-dimensional code identification information through the professional two-dimensional code scanning software on the mobile phone, and the experience identification anti-counterfeiting system can enhance the credibility of the client or the consumer to the material and improve the loyalty of the product in the customer undefined mind. By means of the two-dimension code anti-counterfeiting application based on the internet of things, the circulation way of the fake goods is technically cut off, and the two-dimension code anti-counterfeiting is used for preventing the sellers or other people with ulterior motives from hiding. With the further development of science and technology, the invisible two-dimension code anti-counterfeiting technology based on the internet of things will be a product of anti-fake and shoddy products, illegal entry and tracing problems, and the material flows to a strong "a weapon", and the invisible two-dimension code is used as the tracking and collecting of the file, The inquiry and management mark can realize the quick management of the file without damaging the appearance of the file, low in cost, and is convenient for the unified management of the files.

The embodiments shown and described above are only examples. Therefore, many commonly-known features and details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A paper clamping mechanism comprising:
a base,
a first driving assembly fixing on the base;
a first driven assembly fixing on the base, the first driving assembly being configured for driving the first driven assembly to move;
a first clamping portion being fixed on the base via the first driven assembly; and
a second clamping portion being fixed on the base via the first driven assembly; wherein the first clamping portion is arranged facing the second clamping portion, the first driven assembly is able to drive the first clamping portion to move close to the second clamping portion to clamp a paper, and the first driven assembly is also able to drive the first clamping portion move away from the second clamping portion to release a paper;
the first driven assembly comprises a first screw rod, the first screw rod is fixed with the first base, an extension direction of the first screw rod is the same as a length direction of the first base, the first screw rod is connected with the first driving assembly, the first driving assembly is able to drive the first screw rod to move forward or backward, and the first screw rod carries the first clamping portion and/or the second clamping portion to move.

2. The paper clamping mechanism of claim 1, wherein:
the first clamping portion comprises a first sliding block, a bracket and a first clamping plate; wherein the first sliding block is sleeved and matched with the first screw rod, the first screw rod is able to drive the first sliding block to move, the bracket is fixed on the first sliding block and move parallel along the first sliding block, the first clamping plate is fixed on the bracket, the first clamping plate is able to move to contact the paper of a file document.

3. The paper clamping mechanism of claim 2, wherein:
the second clamping portion comprises two second side plates, a connecting plate and a second clamping plate; wherein the second clamping plate is arranged parallel to the first clamping plate and away from the first base, the two second side plates are arranged parallel to each other and respectively perpendicularly to the second clamping plate, ends of the two second side plates away from the second clamping plate are connected with the connecting plate.

4. The paper clamping mechanism of claim 3, wherein:
the paper clamping mechanism further comprises a pressure sensor, the pressure sensor is fixed on the first clamping portion and/or the second clamping portion.

5. The paper clamping mechanism of claim 4, wherein:
one end of the pressure sensor is fixed to the connecting plate, and the other end of the pressure sensor contacts the second clamping plate, the pressure sensor are configured for detecting pressure between the first clamping plate and the second clamping plate.

6. The paper clamping mechanism of claim 5, wherein:
portions of the first clamping portion and the second clamping portion in contact with a paper are designed in a plate shape.

7. The paper clamping mechanism of claim 6, wherein:
the paper clamping mechanism further comprises an auxiliary screw rod, the auxiliary screw rod is arranged in parallel with the first screw rod, the auxiliary screw rod is connected to the first driving assembly, the first driving assembly is able to drive the auxiliary screw rod, the auxiliary screw rod matches with the first screw rod together drive the first clamping portion and/or the second clamping portion to move.

8. The paper clamping mechanism of claim 7, wherein:
the first driving assembly is an electric motor.

9. An automatic page-turning and scanning system comprising:
an outer frame;
and a paper clamping mechanism fixing on the outer frame, wherein the paper clamping mechanism comprises:
a base,
a first driving assembly fixing on the base;
a first driven assembly fixing on the base, the first driving assembly is configured for driving the first driven assembly to move;
a first clamping portion is fixed on the base via the first driven assembly; and
a second clamping portion is fixed on the base via the first driven assembly; wherein the first clamping portion is arranged opposite to the second clamping portion, the first driven assembly is able to drive the first clamping portion to move close to the second clamping portion to clamp a paper, and the first driven assembly is also able to drive the first clamping portion move away from the second clamping portion to release a paper;
the first driven assembly comprises a first screw rod, the first screw rod is fixed with the first base, an extension direction of the first screw rod is the same as a length direction of the first base, the first screw rod is connected with the first driving assembly, the first driving assembly is able to drive the first screw rod to move forward or backward, and the first screw rod carries the first clamping portion and/or the second clamping portion to move.

10. The automatic page-turning and scanning system of claim 9, wherein:
the first clamping portion comprises a first sliding block, a bracket and a first clamping plate; wherein the first sliding block is sleeved and matched with the first screw rod, the first screw rod is able to drive the first sliding block to move, the bracket is fixed on the first sliding block and move parallel along the first sliding block, the first clamping plate is fixed on the bracket, the first clamping plate is able to move to contact the paper of a file document.

11. The automatic page-turning and scanning system of claim 10, wherein:
the second clamping portion comprises two second side plates, a connecting plate and a second clamping plate; wherein the second clamping plate is arranged parallel to the first clamping plate and away from the first base, the two second side plates are arranged parallel to each other and respectively perpendicularly to the second clamping plate, ends of the two second side plates away from the second clamping plate are connected with the connecting plate.

12. The automatic page-turning and scanning system of claim 11, wherein
the automatic page-turning and scanning system further comprises a code-reading apparatus, the code-reading apparatus is fixed on the outer frame above the paper clamping mechanism, wherein the code-reading apparatus comprises:

a second base;

a second driving assembly fixing on the second base;

a second driven assembly fixing on the second base, the second driven assembly is connected with the second driving assembly for adjusting a position of the scanning assembly;

a scanning assembly is connected with the second driven assembly for acquiring image information of a paper to be scanned, and reading a code of the paper; and a light source is arranged in parallel with the scanning assembly, the light source is connected to the second driven assembly and/or the scanning assembly, and the light source is configured to illuminate a paper to be scanned, and wherein the second driving assembly is configured for driving the second driven assembly to move, and the second driven assembly carries the scanning assembly to move in parallel, and the scanning assembly points to a paper to be scanned to acquire image information of the paper.

13. The automatic page-turning and scanning system of claim 12, wherein the automatic page-turning and scanning system further comprises a page-turning mechanism for turning page of the file document, the page-turning mechanism is fixed on the outer frame, wherein the page-turning mechanism comprises:

a pedestal;

a tray, one side of the tray is perpendicularly fixed on the pedestal, the other side of the tray is extended outwards and used for carrying the file document to be scanned;

a driving portion is mounted in the pedestal, the driving portion comprises a moving portion, and a plurality of lifting levers, one end of each lifting lever is fixed on the moving portion, and the other end of each lifting lever is extended to sweep the file document and contact the file document.

14. The automatic page-turning and scanning system of claim 13, wherein:

the driving portion is connected with a plurality of synchronous wheels, the driving portion is configured to drive the plurality of synchronous wheels; and a synchronous belt been sleeved and matched with the plurality of synchronous wheels, and the synchronous wheels drive the synchronous belt, wherein the lifting levers are fixed on surface of the synchronous belt, the driving motor drives the synchronous wheels to rotate, and the synchronous wheels drive the synchronous belt to rotate, an extending direction of the lifting lever is perpendicular to a movement direction of the synchronous belt, and the lifting lever swept over the tray with the synchronous belt to turn page of the file document.

15. The automatic page-turning and scanning system of claim 14, wherein:

a middle of the tray is defined with a limiting window, and the limiting window is arranged corresponding to the paper clamping mechanism.

16. The automatic page-turning and scanning system of claim 15, wherein:

the automatic page-turning and scanning system further comprises an automatic paper suction apparatus, the automatic paper suction apparatus is fixed on the outer frame, wherein the automatic paper suction apparatus comprises:

a side fixing plate being perpendicularly connected with the tray;

a third driving assembly having a moving portion, the moving portion is connected to the adsorption portion; and an adsorption portion, the adsorption portion changes the air flow state above the file document to adsorb one piece paper of the file document, and the adsorption portion been driven by the third driving assembly to performance a curve motion above the file document.

17. The automatic page-turning and scanning system of claim 16, wherein:

the adsorption portion comprises a connecting rod, a non-contact sucking disc, a gas pipe and an air pump, one end of the connecting rod is connected with the moving portion of the third driving assembly, the other end of the connecting rod is fixed with the non-contact sucking disc, the air pump is connected to the non-contact sucking disc through the gas pipe, and the air pump and the non-contact sucking disc cooperate to change air flow above the file document.

18. The automatic page-turning and scanning system of claim 17, wherein:

the connecting rod comprises a first connecting rod and a second connecting rod, one end of the first connecting rod is sleeved with the moving portion of the third driving assembly, a length direction of the first connecting rod is perpendicular to an axial direction of the moving portion of the third driving assembly, one end of the second connecting rod is fixedly connected to a free end of the first connecting rod, and the other end of the second connecting rod is fixedly connected to the non-contact sucking disc, the first connecting rod and the second connecting rod are arranged perpendicular to each other.

* * * * *